United States Patent
Bertolini et al.

[11] Patent Number: 5,848,496
[45] Date of Patent: Dec. 15, 1998

[54] WINDOW LIFTER FOR VEHICLE DOOR

[75] Inventors: Carlo Bertolini, Feucherolles; Laureut Arquevaux, Sully Sur Loire, both of France

[73] Assignee: Meritor Light Vehicle Systems—France, France

[21] Appl. No.: 725,369

[22] Filed: Oct. 3, 1996

[30] Foreign Application Priority Data

Oct. 3, 1995 [FR] France .................................. 95 11614

[51] Int. Cl.⁶ .................................................. E05F 11/48
[52] U.S. Cl. ................................................ 49/352; 49/375
[58] Field of Search ............................. 49/375, 374, 352, 49/351, 350, 349, 348

[56] References Cited

U.S. PATENT DOCUMENTS

| | | | |
|---|---|---|---|
| 4,644,695 | 2/1987 | Shiraishi et al. | 49/352 |
| 5,363,595 | 11/1994 | Wirsing | 49/375 |
| 5,546,704 | 8/1996 | Marudka | 49/375 |

FOREIGN PATENT DOCUMENTS

| | | | |
|---|---|---|---|
| 0382135 | 2/1989 | European Pat. Off. . | |
| 597764 | 5/1994 | European Pat. Off. | 49/375 |
| 2648504 | 12/1990 | France | 49/371 |
| 3545856 | 1/1987 | Germany | 49/375 |
| 3930106 | 3/1991 | Germany . | |
| 29503036 | 6/1995 | Germany . | |

Primary Examiner—Jerry Redman

[57] ABSTRACT

Window lifter for vehicle door, comprising two rails which are mutually parallel and parallel to the travel of the window glass (3), a rider mounted so that it can slide on each rail and secured to a window glass support clamp device (14) including a part (15) fixed to the rider and a part (16) which can move, articulated to the fixed part, as well as a system of cables which are connected to the riders and provided with means for driving the said cables and the riders; the mobile part (16) of each clamp has a bearing surface (23) for the window glass, situated substantially along the axis of sliding of the rider, this surface being formed by a bent end (24) extending a lateral lug (25) of the mobile part (16). This arrangement makes it possible for the weight of the window glass (3) to be borne on a bearing surface situated on the axis of sliding of the rider along the rail, which eliminates any cantilever effect and therefore any parasitic forces in the mechanism during travel of the window glass.

7 Claims, 2 Drawing Sheets

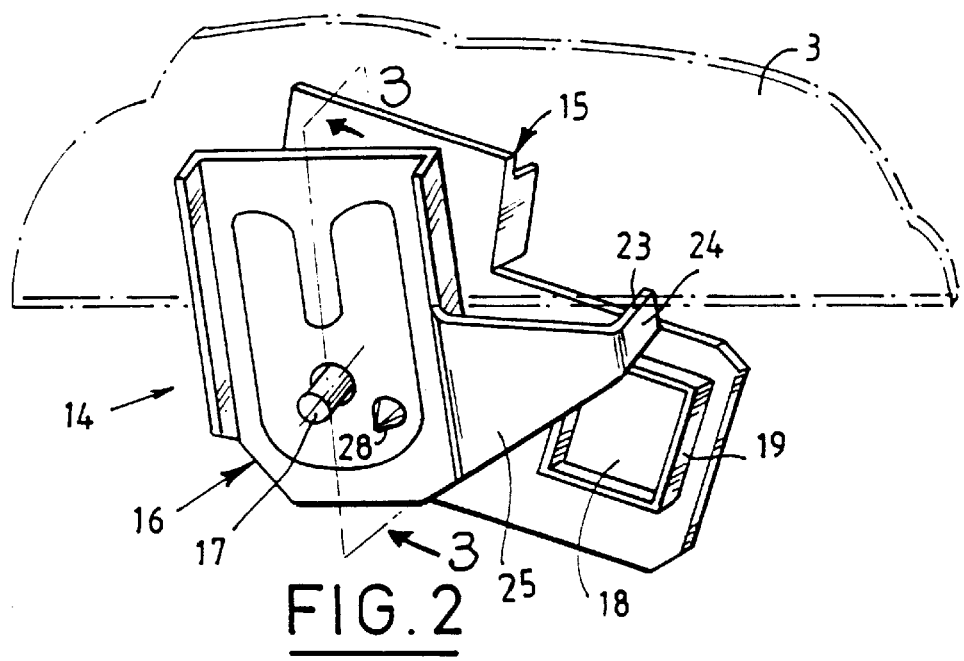
FIG. 2
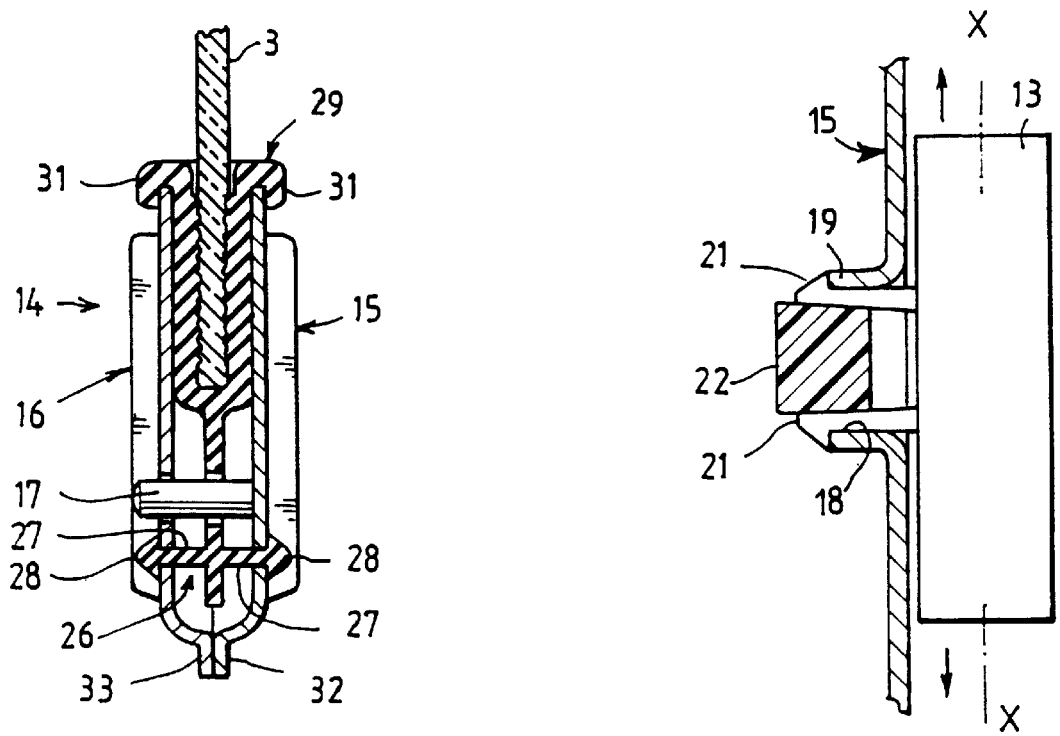
FIG. 3
FIG. 4

WINDOW LIFTER FOR VEHICLE DOOR

BACKGROUND OF THE INVENTION

The subject of the present invention is a window lifter for a vehicle door, of the type comprising two rails which are mutually parallel and parallel to the travel of the window glass, a rider mounted so that it can slide along an axis on each rail and secured to a window glass support clamp device including a part fixed to the rider and a part which can move, articulated to the fixed part; this window lifter is also provided with a system of cables which are connected to the riders and interact with means for driving the said cables and the riders.

This mechanism is customarily adjusted using shims placed on the riders, which act as limit stops for the window glass and make it possible to compensate for spread in the manufacturing tolerances. However, in practice these shims compensate for neither spread in the assembly tolerances nor spread in tolerances of the door. This results in a defect where the upper part of the window glass meets the door frame, which has to be filled by the sealing strip which therefore has to be bulky.

In order to get around this drawback, another embodiment has therefore been proposed in which one of the rails does not have a limit stop. The position of the window glass is set as follows: the window glass is placed in the door frame, the window lifter is raised into its up position, the remaining limit stop coming up against the lower edge of the window glass. The assembly is locked in position, the lower edge of the window glass being clamped between the mobile and fixed parts of the two clamps. The mobile parts are articulated to the fixed parts by means of threaded spindles and lock nuts, the lower edge of the window glass bearing on the threaded spindle of the clamp without a limit stop. Since the threaded spindle is laterally offset relative to the axis of sliding of the rider, this device creates cantilever effect and therefore a parasitic moment which overloads the rider and increases the manoeuvring effort.

The object of the invention is therefore to provide a window lifter so arranged as to eliminate these drawbacks.

In accordance with the invention, the window lifter for a vehicle door is characterized in that the mobile part of each clamp has a bearing surface for the window glass, situated substantially along the axis of sliding of the rider.

The result of this is that the window glass exerts its weight practically along the axis of sliding of the rider, which eliminates any cantilever effect and therefore any parasitic forces.

According to one embodiment of the invention, the bearing surface is formed by one end of a lateral lug of the mobile part of the clamp, the said end being bent transversely to the window glass.

According to another feature of the invention, the window lifter is equipped with a component for elastically returning the said bearing surface against the window glass, this return component being interposed between the part fixed to the rider and the mobile part of the clamp and placed between the spindle about which the mobile part is articulated to the fixed part and the said bearing surface for the window glass.

Other specific features and advantages of the invention will emerge from the description which will follow, given with reference to the attached drawings which illustrate one embodiment thereof by way of non-limiting example.

BRIEF DESCRIPTION OF THE DRAWING

FIG. 2 is a partial perspective view, on an enlarged scale compared to FIG. 1, of a clamp of a combined rider-and-clamp assembly produced in accordance with the invention.

FIG. 3 is a view in section on 3/3 of FIG. 2.

FIG. 4 is a view of the fixed part of the clamp and of the corresponding rider of FIG. 2, showing the arrangement allowing the rider to be secured to the clamp.

DETAILED DESCRIPTION OF THE PREFERRED EMBODIMENT

Figure 1:
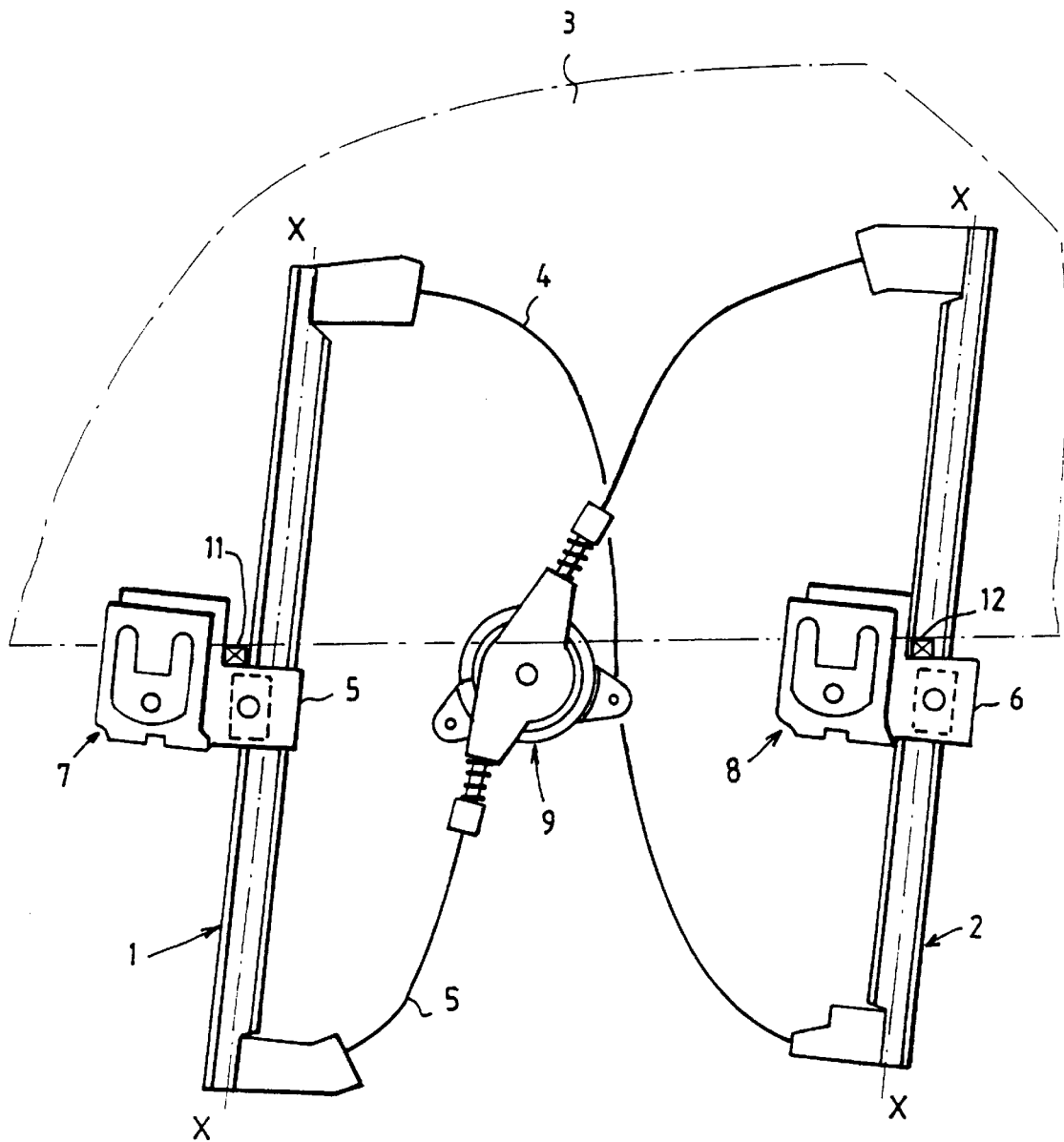
FIG. 1 is a simplified elevation of a window lifter for a vehicle door of the type having two parallel rails, illustrating the state of the prior art.

The window lifter mechanism represented in FIG. 1 comprises two rails 1, 2 which are mutually parallel, substantially parallel to the travel of the window glass 3, and oriented in an almost vertical arrangement, a rider 5, 6 mounted so that it can slide on each respective rail 1, 2 along an axis XX, a clamp device 7,8 associated with each rider and supporting the window glass 3, and a system of cables 4, 5 stretching along the rails 1, 2. Each cable is secured, in a way which is known per se and not represented, to the corresponding rider 5, 6.

The system of cables 4, 5 is supplemented by drive means consisting of a motor unit 9 placed between the rails 1, 2. The cables 4, 5 pass, at opposite ends of the rails 1, 2, over idling pulleys, not represented, and the lower edge of the window glass 3 rests on limit stops 11, 12 placed on the corresponding assemblies composed of rider 5, 6 and clamps 7, 8.

This window lifter device as a whole, and particularly its limit stops 11, 12 on which the window glass 3 bears, illustrates the first known prior art embodiment, explained hereinabove and displays its drawbacks.

An embodiment of a rider/clamp assembly according to the invention will now be described with reference to FIGS. 2 to 4, it being possible for this assembly, within the context of the invention, to replace the corresponding assembly consisting of rider 5 and clamp 7 of the known window lifter of FIG. 1.

A mechanism according to the invention comprises a rider 13 represented diagrammatically (FIG. 4), made in the known way so that it can slide along the corresponding rail 1 or 2, and a clamp device 14. The latter includes a fixed part 15 secured to the rider 13, and a mobile part 16 articulated to the fixed part 15 about a threaded spindle 17 perpendicular to the window glass 3. The parts 15 and 16 are made in the form of sheets appropriately cut and shaped, and designed to clamp the window glass 3 between them.

Formed in a lateral extension of the part 15 is an opening 18 bordered by a collar 19 which projects towards the mobile part 16. The rider 13 is equipped, on its face which faces the fixed part 15, with elastic tongues 21 which can be inserted through the opening 18 and be folded over elastically, by clip-fastening, over the edge of the collar 19, thus fixing the rider 13 to the fixed part 15 of the clamp 14. A plug 22, for example made of plastic, is advantageously inserted between the plastic tongues 21 in order to lock them in place and thus permanently attach the rider 13 to the clamp 14.

A nut, not represented, screwed onto the threaded spindle 17 makes it possible to lock and to clamp the mobile part 16 in the desired angular position about the spindle 17.

The mobile part 16 of the clamp 14 has a bearing surface for the window glass 3 which is situated substantially along the axis of sliding XX of the rider 13. In the embodiment represented, this bearing surface is formed by the upper edge 23 of a bent end 24 extending a lateral lug 25 of the mobile part 16. The lug 25 stretches more or less parallel to the window glass 3 in the direction of the opening 18 and culminates in the end 24, which is bent transversely to the window glass 3. The latter therefore rests on the upper edge face 23 in a position corresponding to a defined angular orientation of the mobile part 16 about the spindle 17.

The mechanism is also equipped with a component 26 for elastically returning the bearing surface 23 against the lower edge of the window glass 3. The elastic component 26, for example made of rubber, is interposed between the part 15 fixed to the rider 13 and the mobile part 16, and in addition is placed between the spindle 17 about which the mobile part 16 is articulated to the fixed part 15, and the said bearing surface 23. This component 26 may, as represented in FIG. 3, have a lower part, the cross section of which is substantially cross-shaped and therefore has two transverse lugs 27 passing through corresponding apertures made in the parts 15, 16 of the clamp 14. The lugs 27 project from the outer faces of the parts 15, 16 in the form of points 28 which secure the component 26 to the parts 15 and 16.

In the direction of the window glass 3, the elastic component 26 is extended by a U-shaped profile 29 for clamping and accommodating the lower edge of the window glass 3. The upper edges 31 of the profile 29 cap the upper edge surfaces of the parts 15, 16 when the window glass 3 is appropriately positioned between these parts and when the said upper edge surfaces are thus more or less parallel.

The lower edges 32, 33 of the parts 15, 16 are profiled so that they can be pressed against each other when the mobile part 16 is clamped onto the profile 29. Advantageously, the opposing faces of the lower edges 32, 33 are provided with means making it possible to improve the secureness of the attachment of the parts 15, 16, for example with mating toothings (not visible in the drawings).

As each rail 1, 2 is equipped with an assembly consisting of rider 13 and clamp 14, this mechanism can be put into use very simply: the window glass 3 is placed in its frame, the mobile parts 16 then being oriented so as to place the upper edges 23 of the ends 24 against the lower edge of the window glass 3. The clamps 14 are then tightened using nuts screwed onto the threaded spindles 17 in order to lock the mobile parts 16 in place with the desired orientation. Once the clamps 14 have thus been clamped onto the window glass 3, the spreads in tolerance in the mechanism or in the assembly are taken up, so that the top of the window glass always shuts satisfactorily, and does so without creating additional parasitic forces in the mechanism. This is because the weight of the window glass 3 rests on the bent ends 24 which are situated practically along the axes XX of sliding of the riders 13.

The invention is not limited to the embodiment described and may be realized in alternative ways. Thus it is particularly obvious that the bearing surfaces 23 for the window glass 3 may be obtained by any equivalent means, for example by replacing the mobile parts 16 and their lateral lugs 25 with solid components which have any profile but which delimit a bearing surface for the window glass which lies substantially on the axis of sliding XX.

We claim:

1. A window lifter and window assembly for a vehicle door, the window lifter and the window assembly comprising:

a window;

two rails which are mutually parallel and which are further parallel to a direction of travel of said window, each said rail having a slide axis;

two riders, each of which is mounted slidingly along a slide axis of one of said rails;

two window support clamps, each of said riders further secured to one of said window support clamps, each of said window support clamps having a fixed part and movable part, the fixed part is fixed to the rider and the movable part is articulable with respect to the fixed part;

at least one driven cable connected to the riders;

said driven cable connecting to a drive means adapted to drive said cable and to correspondingly drive said riders, wherein said movable part of each said window support clamps has a bearing surface adapted to bear against said window, said bearing surfaces situated substantially along the slide axes of the riders.

2. A window lifter according to claim 1, wherein each said movable part of each said window support clamps has a lug formed thereon, each said lug having at least one end, each bearing surfaces comprising said one ends of said lugs, each said one end being bent transversely with respect to the window.

3. A window lifter according to claim 2, further including a spindle about which said movable part articulates, and further including an elastic urging component for urging said bearing surface against the window, said elastic urging component interposed between said fixed part and said movable part and said elastic urging component further located between said spindle and said bearing surface.

4. A window lifter according to claim 3, wherein said window has a lower edge, and wherein said elastic urging component is secured to both the fixed part and to the movable part of the window support clamp, wherein said elastic urging component has a U-shaped profile suitable for clamping the lower edge of the window, wherein said U-shaped profile is urged by the movable part onto the fixed part of the window support clamp.

5. A window lifter comprising:

two rails which are mutually parallel, each said rail having a slide axis;

two riders, each of which is mounted slidingly along a slide axis of one of said rails;

two window support clamps, each of said riders further secured to one of said window support clamps, each of said window support clamps having a fixed part and movable part, the fixed part is fixed to the rider and the movable part is articulable with respect to the fixed part;

at least one driven cable connected to the riders;

said driven cable connecting to a drive means adapted to drive said cable and to correspondingly drive said riders, wherein said movable part of each said window support clamps has a bearing surface adapted to bear against a window, said bearing surfaces situated substantially along the slide axes of the riders.

6. A window lifter according to claim 5, wherein each said movable part of each said window support clamps has a lug formed thereon, each said lug having at least one end forming said bearing surface each said one end being bent transversely with respect to the slide axes.

7. A window lifter according to claim 6, further including a spindle about which said movable part articulates, and further including an elastic urging component for urging said bearing surface articulably, said elastic urging component interposed between said fixed part and said movable part and said elastic urging component further located between said spindle and said bearing surface.

* * * * *